United States Patent
Damnjanovic et al.

(10) Patent No.: US 11,012,947 B2
(45) Date of Patent: May 18, 2021

(54) UPLINK MULTI-POWER AMPLIFIER/ANTENNA OPERATION AND CHANNEL PRIORITIZATION

(75) Inventors: Jelena M. Damnjanovic, Del Mar, CA (US); Juan Montojo, San Diego, CA (US); Peter Gaal, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 920 days.

(21) Appl. No.: 12/906,700

(22) Filed: Oct. 18, 2010

(65) Prior Publication Data

US 2011/0092219 A1 Apr. 21, 2011

Related U.S. Application Data

(60) Provisional application No. 61/253,796, filed on Oct. 21, 2009.

(51) Int. Cl.
*H04W 52/28* (2009.01)
*H04W 52/42* (2009.01)
*H04W 52/34* (2009.01)
*H04W 52/14* (2009.01)
*H04W 52/32* (2009.01)

(52) U.S. Cl.
CPC ....... *H04W 52/281* (2013.01); *H04W 52/346* (2013.01); *H04W 52/42* (2013.01); *H04W 52/146* (2013.01); *H04W 52/325* (2013.01)

(58) Field of Classification Search
USPC ....................................... 370/329
See application file for complete search history.

(56) References Cited

U.S. PATENT DOCUMENTS

| 7,161,916 | B2 | 1/2007 | Malladi et al. |
| 8,553,712 | B2 | 10/2013 | Ghosh et al. |
| 9,655,091 | B2* | 5/2017 | Papasakellariou .. H04W 36/385 |
| 2005/0135312 | A1 | 6/2005 | Montojo et al. |

(Continued)

FOREIGN PATENT DOCUMENTS

| JP | 2007515139 A | 6/2007 |
| JP | 2008017074 A | 1/2008 |

(Continued)

OTHER PUBLICATIONS

Ericsson: "DC-HSUPA power scaling" 3GPP Draft; R1-091894 DC-HSUPA Power Scaling, 3rd Generation Partnership Project (3GPP), Mobile Competence Centre ; 650, Route Des Lucioles ; F-06921 Sophia-Antipolis Cedex ; France, No. San Francisco, USA; Apr. 28, 2009, Apr. 28, 2009 (Apr. 28, 2009), XP050339385.

(Continued)

*Primary Examiner* — Gregory B Sefcheck
*Assistant Examiner* — Majid Esmaeilian
(74) *Attorney, Agent, or Firm* — QUALCOMM Incorporated

(57) ABSTRACT

Certain aspects of the present disclosure relate to techniques for controlling transmission power and prioritizing transmission carriers. A method of power distribution for different physical layer channels over one or more carriers in case of power limited user equipment (UE) is proposed. Operation modes of the UE with single and multiple power amplifiers/antennas can be supported.

49 Claims, 5 Drawing Sheets

(56) References Cited

U.S. PATENT DOCUMENTS

| | | | |
|---|---|---|---|
| 2006/0274847 A1* | 12/2006 | Molisch | H04B 7/0691 375/267 |
| 2008/0008229 A1 | 1/2008 | Hamabe et al. | |
| 2009/0197632 A1 | 8/2009 | Ghosh et al. | |
| 2009/0203383 A1 | 8/2009 | Shen et al. | |
| 2010/0067457 A1* | 3/2010 | Wang | H04W 72/0406 370/329 |
| 2010/0074128 A1* | 3/2010 | Ishii | H04L 1/1825 370/252 |
| 2011/0002322 A1* | 1/2011 | Kim | H04J 11/0023 370/344 |
| 2011/0038271 A1* | 2/2011 | Shin | H04W 52/146 370/252 |
| 2011/0280169 A1 | 11/2011 | Seo et al. | |
| 2012/0020286 A1 | 1/2012 | Damnjanovic et al. | |
| 2012/0269146 A1* | 10/2012 | Pajukoski | H04B 7/024 370/329 |

FOREIGN PATENT DOCUMENTS

| | | |
|---|---|---|
| JP | 2009212607 A | 9/2009 |
| JP | 2012525030 A | 10/2012 |
| WO | WO-05020465 | 3/2005 |
| WO | 2005062492 A1 | 7/2005 |
| WO | 2006103067 A1 | 10/2006 |
| WO | WO-2007043108 A1 | 4/2007 |
| WO | WO-2007138650 A1 | 12/2007 |
| WO | WO-2009099974 A1 | 8/2009 |
| WO | WO2010144864 | 12/2010 |

OTHER PUBLICATIONS

Interdigital Communication LLC: "Power scaling for data and control channel QQ HSUPA" 3GPP Draft, R1-092599, 3rd Generation Partnership Project (3GPP), Mobile Competence Centre, 650, Route Des Lucioles, F-06921 Sophia-Antipolis Cedex, France, No. Los Angeles, USA, Jun. 24, 2009, Jun. 24, 2009 (Jun. 24, 2009), XP050351093.

Qualcomm Incorporated: "UL Power Control for Multicarrier Operation" 3GPP Draft; R1-100677 UL Power Control for MC, 3rdd Generation Partnership Project (3GPP), Mobile Competence Centre; 650, Route Des Lucioles; F-06921 Sophia-Antipolis Cedex; France, vol. RAN WG1, No. Valencia, Spain; Jan. 18, 2010, Jan. 12, 2010 (Jan. 12, 2010), XP050418270 [retrieved on Jan. 12, 2010] the whole document.

Taiwan Search Report—TW099135977—TIPO—dated Jul. 3, 2013.

International Search Report and Written Opinion—PCT/US2010/053493, International Search Authority—European Patent Office—dated Feb. 28, 2011.

Ericsson et al., "Uplink Power Control for Carrier Aggregation", 3GPP Draft; R1-094274 ULPC for Carrier Aggregation, 3rd Generation Partnership Project (3GPP), Mobile Competence Centre; 650, Route Des Lucioles; F-06921 Sophia-Antipolis Cede; France, No. Miyazaki; Oct. 12, 2009, Oct. 16, 2009 (Oct. 16, 2009), XP050388737, [retrieved on Oct. 5, 2009].

Samsung: "UL Transmission Power Control in LTE-A", 3GPP TSG-RAN WG1#56b R1-091250, Mar. 23, 2009.

LG Electronics, "Uplink transmission under UE tranmit power limitation in LTE-Advanced," 3GPP R1-094165,3GPP,Oct. 12, 2009.

Nokia Siemens Networks et al., "Primary Component Carrier Selection, Monitoring and Recovery", 3GPP Draft, R1-091779, 3rd Generation Partnership Project (3GPP), Mobile Competence Centre, 650, Route Des Lucioles, F-06921 Sophia-Antipolis Cedex, France, No. San Francisco, USA, Apr. 28, 2009, Apr. 28, 2009 (Apr. 28, 2009), XP050339300, [retrieved on Apr. 28, 2009].

European Search Report—EP13020033—Search Authority—The Hague—dated Feb. 6, 2014.

LG Electronics: "Uplink multiple channel transmission under UE transmit power limitation," 3GPP Draft; R1-091206 LTEA UL TXP Limitation, 3rd Generation Partnership Project (3GPP). Mobile Competence Centre; 650, Route Des Lucioles; F-06921 Sophia-Antipolis Cedex; France, No. Seoul, Korea; Mar. 17, 2009, Mar. 17, 2009 (Mar. 17, 2009), XP050338821.

CATT: "CQI feedback for LTE-A", 3GPP R1-094148, 3GPP, Oct. 12, 2009, 3 Pages.

Huawei: "PCFICH issue on Cross-Carrier PDCCH Indication", 3GPP R1-094343, 3GPP, Oct. 12, 2009, 3 Pages.

Nokia Siemens et al., "Way forward on LTE-A UL PC", 3GPP R1-094387, 3GPP, Oct. 12, 2009, 3 Pages.

Qualcomm Europe, SRS Multiplexing Structure, 3GPP TSG RAN1#50-bis R1-073911, [retrieved on Oct. 2, 2007], Retrieved from the Internet: URL:http://www.3gpp.org/ftp/tsg_ran/wg1_rl1/TSGR1_50b/Docs/R1-073911.zip.

Samsung: "Multiplexing of ACK/NACK, CQI & SR in LTE-A", 3GPP Draft; R1-091882, 3rd Generation Partnership Project (3GPP), Mobile Competence Centre; 650, Route Des Lucioles; F-06921 Sophia-Antipolis Cedex; France, No. San Francisco, USA; Apr. 28, 2009, Apr. 28, 2009, XP050339376, [retrieved on Apr. 28, 2009], 3 pages.

\* cited by examiner

UPLINK MULTI-POWER AMPLIFIER/ANTENNA OPERATION AND CHANNEL PRIORITIZATION

CLAIM PRIORITY UNDER 35 U.S.C. § 119

The present application for patent claims benefit of U.S. Provisional Patent Application No. 61/253,796, entitled, "Uplink multi-power amplifier/antenna operation and channel prioritization", filed Oct. 21, 2009, and assigned to the assignee hereof and hereby expressly incorporated by reference herein.

BACKGROUND

Field

Certain aspects of the present disclosure generally relate to wireless communications and, more particularly, to a method for controlling transmit power and prioritizing transmission carriers.

Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, $3^{rd}$ Generation Partnership Project (3GPP) Long Term Evolution (LTE) systems, Long Term Evolution Advanced (LTE-A) systems, and Orthogonal Frequency Division Multiple Access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

In addition, terminals can communicate with base stations over one or more frequency carriers. As described, channels can be logically defined over the one or more carriers for transmitting certain types of data, such as data channels, which can be shared among terminals, control channels, and/or the like. Control data sent over the control channels can relate to quality of communication over one or more data channels, including error correction data (such as hybrid automatic repeat/request (HARQ)), channel quality indicators (CQI), precoding matrix indicators (PMI), rank indicators (RI), and/or the like. HARQ or other error correction data, for example, can include transmitting an acknowledgement (ACK) or negative acknowledgement (NACK) of successfully receiving communications over a data channel. For example, where NACK is received for a communication, the transmitter can retransmit all or a portion of the communication to ensure successful receipt.

SUMMARY

Certain aspects of the present disclosure provide a method for wireless communications. The method generally includes determining a prioritization of a collection of carriers allocated for transmitting wireless signals, adjusting transmission power for a plurality of carriers in the collection of carriers according to the prioritization, and transmitting signals over one or more of the carriers using one or more antennas according to the transmission power.

Certain aspects of the present disclosure provide an apparatus for wireless communications. The apparatus generally includes at least one processor, and a memory coupled to the at least one processor, wherein the at least one processor is configured to determine a prioritization of a collection of carriers allocated for transmitting wireless signals, adjust transmission power for a plurality of carriers in the collection of carriers according to the prioritization, and transmit signals over one or more of the carriers using one or more antennas according to the transmission power.

Certain aspects of the present disclosure provide an apparatus for wireless communications. The apparatus generally includes means for determining a prioritization of a collection of carriers allocated for transmitting wireless signals, means for adjusting transmission power for a plurality of carriers in the collection of carriers according to the prioritization, and means for transmitting signals over one or more of the carriers using one or more antennas according to the transmission power.

Certain aspects of the present disclosure provide a computer program product. The computer program product generally includes a computer-readable medium comprising code for determining a prioritization of a collection of carriers allocated for transmitting wireless signals, adjusting transmission power for a plurality of carriers in the collection of carriers according to the prioritization, and transmitting signals over one or more of the carriers using one or more antennas according to the transmission power.

Certain aspects of the present disclosure provide a method for wireless communications. The method generally includes determining a prioritization of one or more carriers allocated for transmitting signals in a wireless network, and transmitting the prioritization to one or more apparatuses that transmit signals over the one or more carriers.

Certain aspects of the present disclosure provide an apparatus for wireless communications. The apparatus generally includes at least one processor, and a memory coupled to the at least one processor, wherein the at least one processor is configured to determine a prioritization of one or more carriers allocated for transmitting signals in a wireless network, and transmit the prioritization to one or more apparatuses that transmit signals over the one or more carriers.

Certain aspects of the present disclosure provide an apparatus for wireless communications. The apparatus generally includes means for determining a prioritization of one or more carriers allocated for transmitting signals in a wireless network, and means for transmitting the prioritization to one or more apparatuses that transmit signals over the one or more carriers.

Certain aspects of the present disclosure provide a computer program product. The computer program product generally includes a computer-readable medium comprising code for determining a prioritization of one or more carriers allocated for transmitting signals in a wireless network, and transmitting the prioritization to one or more apparatuses that transmit signals over the one or more carriers.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
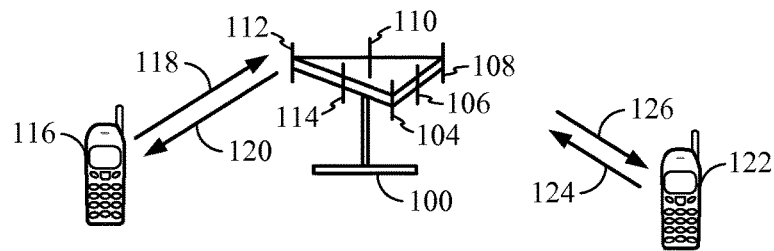
FIG. 1 illustrates an example multiple access wireless communication system in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) and Long Term Evolution Advanced (LTE-A) are upcoming releases of UMTS that use E-UTRA. UTRA, E-UTRA, GSM, UMTS, LTE and LTE-A are described in documents from an organization named "3rd Generation Partnership Project" (3GPP). CDMA2000 is described in documents from an organization named "3rd Generation Partnership Project 2" (3GPP2). CDMA2000 is described in documents from an organization named "3rd Generation Partnership Project 2" (3GPP2). These various radio technologies and standards are known in the art. For clarity, certain aspects of the techniques are described below for LTE-A, and LTE-A terminology is used in much of the description below.

Single carrier frequency division multiple access (SC-FDMA) is a transmission technique that utilizes single carrier modulation at a transmitter side and frequency domain equalization at a receiver side. The SC-FDMA has similar performance and essentially the same overall complexity as those of OFDMA system. However, SC-FDMA signal has lower peak-to-average power ratio (PAPR) because of its inherent single carrier structure. The SC-FDMA has drawn great attention, especially in the uplink communications where lower PAPR greatly benefits the mobile terminal in terms of transmit power efficiency. It is currently a working assumption for uplink multiple access scheme in the 3GPP LTE, LTE-A, and the Evolved UTRA.

An access point ("AP") may comprise, be implemented as, or known as NodeB, Radio Network Controller ("RNC"), eNodeB ("eNB"), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment ("UE"), a user station, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects the node is a wireless node. Such wireless node may provide, for example, connectivity for or to a network (e.g., a wide area network such as the Internet or a cellular network) via a wired or wireless communication link.

Referring to FIG. 1, a multiple access wireless communication system according to one aspect is illustrated. An access point 100 (AP) may include multiple antenna groups, one group including antennas 104 and 106, another group including antennas 108 and 110, and an additional group including antennas 112 and 114. In FIG. 1, only two antennas are shown for each antenna group, however, more or fewer antennas may be utilized for each antenna group. Access terminal 116 (AT) may be in communication with antennas 112 and 114, where antennas 112 and 114 transmit information to access terminal 116 over forward link 120 and receive information from access terminal 116 over reverse link 118. Access terminal 122 may be in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In one aspect of the present disclosure each antenna group may be designed to communicate to access terminals in a sector of the areas covered by access point 100.

In communication over forward links 120 and 126, the transmitting antennas of access point 100 may utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

Figure 2:
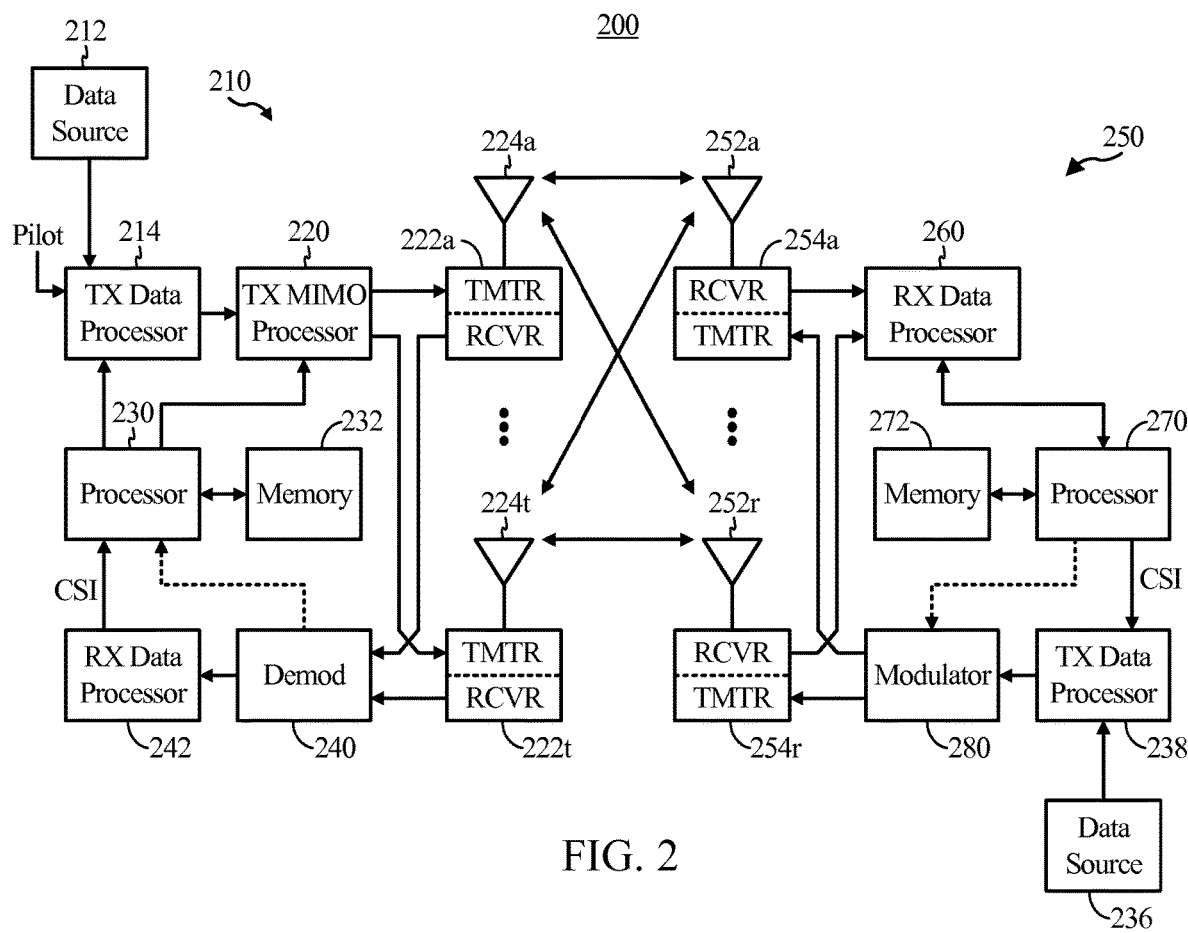
FIG. 2 illustrates a block diagram of an access point and a user terminal in accordance with certain aspects of the present disclosure.

FIG. 2 illustrates a block diagram of an aspect of a transmitter system 210 (also known as the access point) and a receiver system 250 (also known as the access terminal) in a multiple-input multiple-output (MIMO) system 200. At the transmitter system 210, traffic data for a number of data streams is provided from a data source 212 to a transmit (TX) data processor 214.

In one aspect of the present disclosure, each data stream may be transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects of the present disclosure, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals may be received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and further process the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 may be complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights, and then processes the extracted message.

Figure 3:
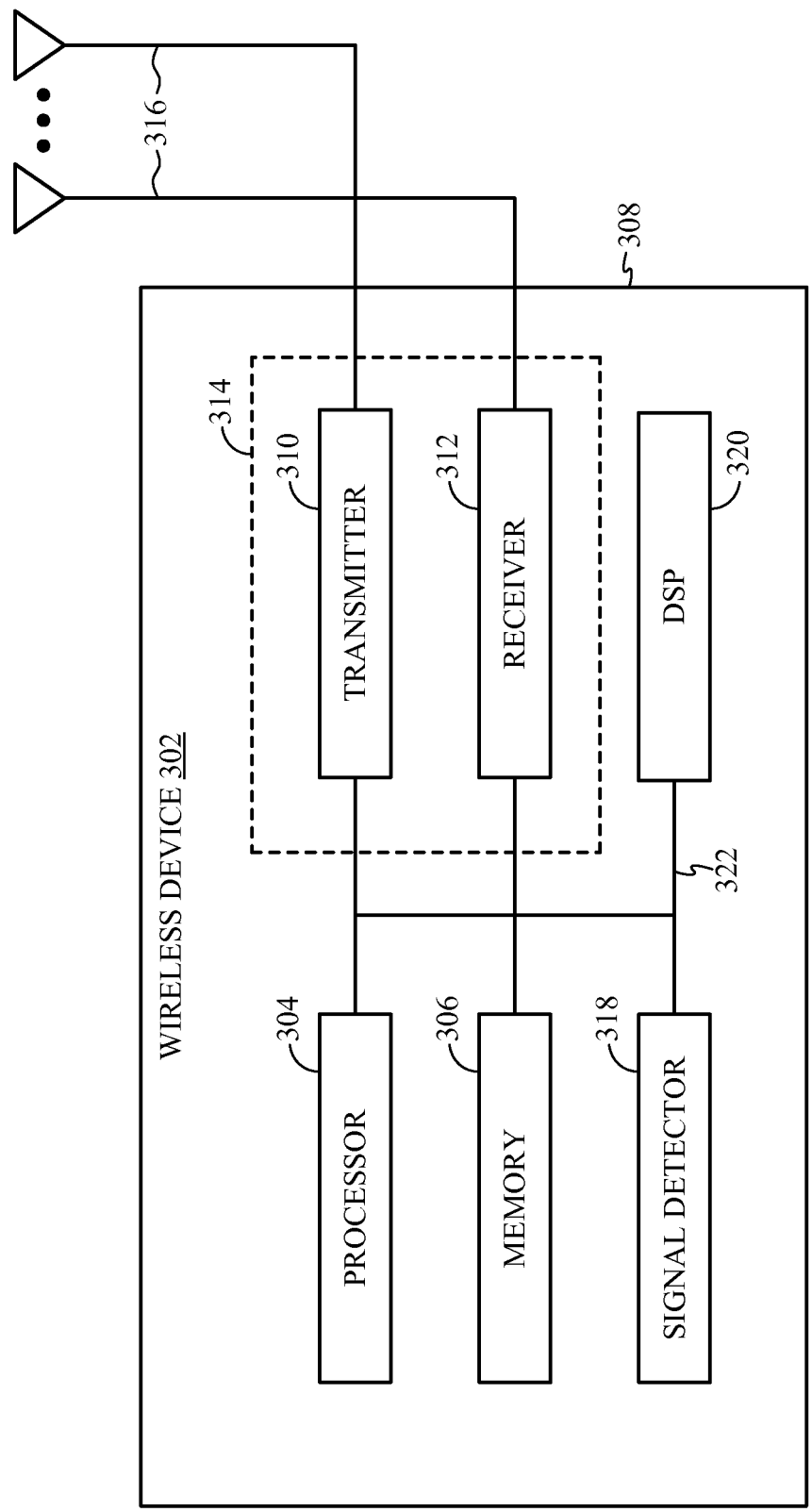
FIG. 3 illustrates a block diagram of an example wireless device in accordance with certain aspects of the present disclosure.

FIG. 3 illustrates various components that may be utilized in a wireless device 302 that may be employed within the wireless communication system from FIG. 1. The wireless device 302 is an example of a device that may be configured to implement the various methods described herein. The wireless device 302 may be an access point 100 from FIG. 1 or any of access terminals 116, 122.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

In one aspect of the present disclosure, logical wireless communication channels may be classified into control channels and traffic channels. Logical control channels may comprise a Broadcast Control Channel (BCCH) which is a downlink (DL) channel for broadcasting system control information. A Paging Control Channel (PCCH) is a DL logical control channel that transfers paging information. A Multicast Control Channel (MCCH) is a point-to-multipoint DL logical control channel used for transmitting Multimedia Broadcast and Multicast Service (MBMS) scheduling and control information for one or several Multicast Traffic Channels (MTCHs). Generally, after establishing Radio Resource Control (RRC) connection, the MCCH may be only used by user terminals that receive MBMS. A Dedicated Control Channel (DCCH) is a point-to-point bi-directional logical control channel that transmits dedicated control information and it is used by user terminals having an RRC connection. Logical traffic channels may comprise a Dedicated Traffic Channel (DTCH) which is a point-to-point bi-directional channel dedicated to one user terminal for transferring user information. Furthermore, logical traffic channels may comprise a Multicast Traffic Channel (MTCH), which is a point-to-multipoint DL channel for transmitting traffic data.

Transport channels may be classified into DL and UL channels. DL transport channels may comprise a Broadcast Channel (BCH), a Downlink Shared Data Channel (DL-SDCH) and a Paging Channel (PCH). The PCH may be utilized for supporting power saving at the user terminal (i.e., Discontinuous Reception (DRX) cycle may be indicated to the user terminal by the network), broadcasted over entire cell and mapped to physical layer (PHY) resources which can be used for other control/traffic channels. The UL transport channels may comprise a Random Access Channel (RACH), a Request Channel (REQCH), an Uplink Shared Data Channel (UL-SDCH) and a plurality of PHY channels.

The PHY channels may comprise a set of DL channels and UL channels. The DL PHY channels may comprise: Common Pilot Channel (CPICH), Synchronization Channel (SCH), Common Control Channel (CCCH), Shared DL Control Channel (SDCCH), Multicast Control Channel (MCCH), Shared UL Assignment Channel (SUACH), Acknowledgement Channel (ACKCH), DL Physical Shared Data Channel (DL-PSDCH), UL Power Control Channel (UPCCH), Paging Indicator Channel (PICH), and Load Indicator Channel (LICH). The UL PHY Channels may comprise: Physical Random Access Channel (PRACH), Channel Quality Indicator Channel (CQICH), Acknowledgement Channel (ACKCH), Antenna Subset Indicator Channel (ASICH), Shared Request Channel (SREQCH), UL Physical Shared Data Channel (UL-PSDCH), and Broadband Pilot Channel (BPICH).

In an aspect, a channel structure is provided that preserves low PAPR (at any given time, the channel is contiguous or uniformly spaced in frequency) properties of a single carrier waveform.

Long Term Evolution Advanced (LTE-A) uplink (UL) design may allow exceptions to preservation of the single carrier property of UL transmissions. Examples of UL transmissions may include transmissions over the reverse links 118 and 124 in FIG. 1, transmissions from the access terminal 250 to the system 210 in FIG. 2, and/or transmissions from the wireless device 302 in FIG. 3 to an associated base station. In LTE Release-8 (Rel-8), where an UL waveform may be strictly Single Carrier Frequency Division Multiple Access (SC-FDMA) based, concurrent physical layer (PHY) channels may be dropped in order to preserve the single carrier (SC) property of the UL transmission. In LTE-A, PHY channels may not be dropped unless a maximum transmit power is reached. The channel dropping and/or power scaling may be performed only if a composite transmit power exceeds the maximum available transmit power.

Depending on an operational regime of user equipment (UE), it may be desirable to preserve the SC property on each of the used power amplifiers (PAs) and/or antennas that may be associated with the PAs of the UE. A subset of the PAs may be utilized up to their maximum transmit power, while the rest of the PAs may be turned off. The same information may be transmitted on all PAs/antennas. In one aspect of the present disclosure, the PA's transmit power may be filled-up with more than one channel, if this is required and possible. In this case, the SC property of UL transmissions may be broken. In an aspect, the PA's transmit power may be filled-up according to channel prioritization.

Certain aspects of the present disclosure support a method of power distribution for Physical Uplink Control Channel (PUCCH) and Physical Uplink Shared Channel (PUSCH) over multiple carriers in case of a power limited UE. Operation modes of the UE with single and multiple PAs/antennas may be supported.

Power Control and Channel Prioritization

According to aspects described herein, wireless devices may prioritize carriers for transmission and control power over the carriers. For example, high priority data may be transmitted over high priority carriers at an increased power. Lower priority data, however, may be transmitted at a lower power relying, for example, on hybrid automatic repeat/request (HARQ) or on other error correction techniques to ensure effective transmission.

In one aspect, carrier priorities may be defined by a wireless network specification. In another aspect, a UE may select high priority carriers among scheduled UL carriers to transmit high priority data. Therefore, in a power limited case, the UE may prioritize one carrier (or possibly more carriers) and transmit on it high priority data that do not tolerate delay, while the rest may rely on HARQ.

This approach may not depart from the Rel-8 concept. For example, the Rel-8 scheduling may only specify the assigned resources, which may not be specific to different traffic flows that the UE may have. Therefore, although the scheduler may give an assignment considering specific number of bits taken from specific flows on specific carriers, the UE may utilize the given assignment differently. This may be true even if the same algorithm is applied at the UE and the scheduler side, due to possible differences in the buffer status. In addition, interpretation how to use the assigned resources across flows may be different.

Hence, if the UE is power limited obtaining assignments on several carriers and it has high priority data scheduled for transmission, then the UE may transmit these data with as much power as it can (or needs) on one of the assignments, and may starve other carrier transmissions. Whichever carrier (for high priority data transmission) it turns out to be, that carrier may effectively become 'high priority' carrier. In addition, as described, the carrier priority may be defined in a network specification or otherwise controlled by the wireless network or by one or more devices providing wireless network access to the UE (e.g., based on previous use, capacity, available resources, and so on). For example, transmission of Physical Uplink Shared Channel (PUSCH) over the 'high priority' carrier may be of a higher priority than transmission of PUSCH over one or more other carriers.

According to an aspect, the UE may comprise multiple power amplifiers and antennas associated with the power amplifiers. In this case, various power amplification and channel prioritization schemes may be utilized to effectively transmit data in the wireless network.

Figure 4:
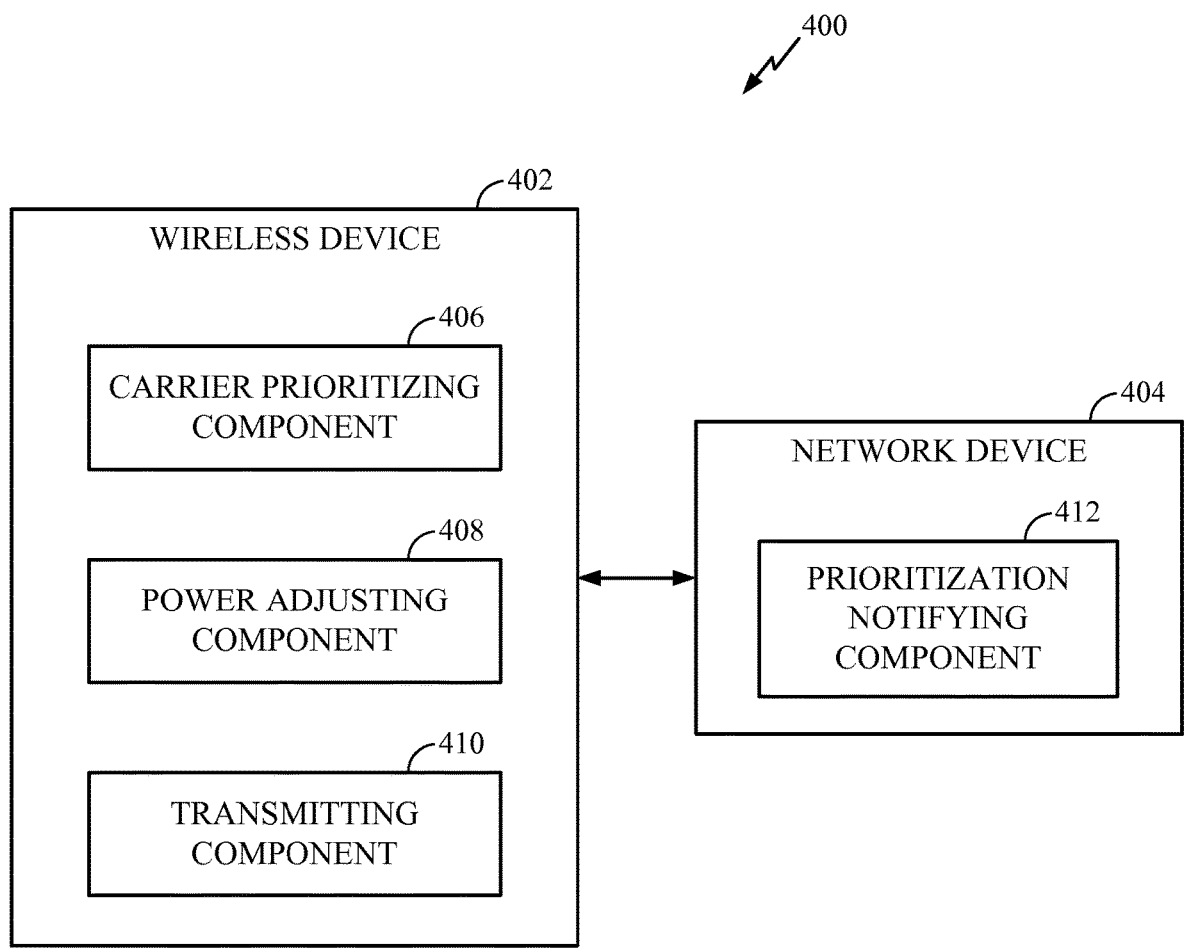
FIG. 4 illustrates a block diagram of an example system that facilitates carrier prioritization and power control in accordance with certain aspects of the present disclosure.

FIG. 4 illustrates an example system that facilitates carrier prioritization and power control in wireless networks. A wireless device 402 is provided, which may be a mobile device, UE, access terminal, or any power limited device that communicates in a wireless network. A network device 404 is also illustrated, which may communicate with the wireless device 402. The network device 404 may additionally be an access point, upstream network component, or any device that communicates with the wireless device 402.

The wireless device 402 may comprise a carrier prioritizing component 406 that may rank one or more carriers for transmitting high priority traffic, low priority traffic, and/or varying priority levels of traffic, a power adjusting component 408 that may modify transmission power of one or more antennas for transmitting data over the one or more carriers based on their respective priority levels, and a transmitting component 410 that may transmit data over the carriers using multiple antennas at the appropriate power. As described, the carriers may relate to logically defined channels, such as data or control channels—the type of data transmitted over the channels may be utilized in determining priority for the related carriers. The network device 404 may optionally comprise a prioritization notifying component that may develop or receive carrier prioritization and transmit the prioritization to the wireless device 402.

In an aspect, the wireless device 402 may communicate with the network device 404 directly or through one or more additional components. The wireless device 402 may transmit signals to the network device 404 or another device, for example, over one or more frequency carriers. Channels may be logically defined over collections of carriers, such as physical uplink data channels (which may be shared among wireless devices), uplink control channels, and so on. Based on the channel and/or the data to transmit over the channel, the carrier prioritizing component 406 may rank carriers related to the channels and/or designate the carriers as high, low, or other intermediary priorities.

In one aspect of the present disclosure, the carrier prioritizing component 406 may maintain prioritization for a collection of carriers based on previous priorities, available resources, sensitivity of data transmitted over the channels, and/or the like. The power adjusting component 408 may select one or more transmit powers for one or more signals over the collection of carriers based on the prioritization, and the transmitting component 410 may transmit the signals over the carriers using one or more antennas at the selected powers.

In another aspect of the present disclosure, the prioritization notifying component 412 may provide the carrier prioritizing component 406 with a network specified carrier prioritization, as described. It is to be appreciated that the prioritization scheme may be specified as relating to at least two types of data to be transmitted over the one or more antennas, for example.

For certain aspects of the present disclosure, the carrier prioritizing component 406 and power adjusting component 408 may prioritize carriers and distribute power for PUCCH and PUSCH over multiple carriers in case of the power limited wireless device 402 according to the following procedure.

PUCCH may be first accommodated across carriers. This may be performed according to a priority of each carrier, if the carrier priorities are defined. In an aspect, scaling factors may be defined to determine a fraction of the power used for each carrier. Uniform power distribution across carriers may represent the special case where the scaling coefficients are the same.

If no explicit carrier priorities are defined, following PUCCH components may be prioritized for transmission in this particular order: multicarrier Acknowledgement/Negative Acknowledgement (ACK/NACK) feedback, single carrier ACK/NACK (where MIMO ACK/NACK has a higher priority than Single Input Multiple Output (SIMO) ACK/NACK), ACK/NACK multiplexed with CQI/PMI/RI, Scheduling Request (SR), Rank Indicator (RI), CQI/PMI (where wideband CQI/PMI has a higher priority than subband CQI/PMI), and Sounding Reference Signal (SRS).

If explicit carrier priorities are defined, ACK/NACK feedback of all carriers may be accommodated according to the carrier priority, but before any other feedback type, regardless of the carrier priority. For example, ACK/NACK of a carrier with a lower priority may have precedence over a CQI feedback of another carrier with a higher priority than the ACK/NACK carrier. This may apply for the ACK/NACK transmission only. For other channels, the carrier priority may have precedence.

PUSCH may be accommodated across carriers following the PUCCH accommodation. In an aspect, uniform power scaling may be sufficient for the PUSCH accommodation. Power scaling based on the priority may be desirable if there are 'high priority' carriers that carry delay sensitive traffic (Quality of Service (QoS) sensitive scheduling across carriers). In one aspect of the present disclosure, high priority carriers may be by designation high priority, and, therefore, QoS sensitive data may be put on these carriers. In another aspect, the carriers with QoS sensitive data may represent just regular carriers, which may become high priority carriers if the QoS sensitive data are put on them, in case of UE power limitation.

If all carriers are of the same priority, the power allocated for data transmission may be scaled uniformly across carriers. If there is control information multiplexed together with data on PUSCH, transmitting control information together with data on PUSCH may be prioritized over transmitting pure data on PUSCH. Further, PUSCH may be dropped and PUCCH may be transmitted only if required due to a transmit power constraint. In addition, Radio Resource Control (RRC) and Media Access Control (MAC) signaling (e.g., power headroom report, measurement reports, etc) transmitted on PUSCH may have priority over at least one of: transmission of regular data on PUSCH over one or more other carriers, transmission of the regular data on PUSCH along with uplink control information (UCI), or transmission of PUCCH.

Operation with Single and Multiple Power Amplifiers

In the case of a single power amplifier (PA) implementation at UE and transmission over one or more carriers, all the aforementioned rules for transmit power control and channel prioritization may be directly applied.

When the power adjusting component 408 controls power for multiple PAs (e.g., related to multiple antennas), different types of data may be simultaneously transmitted over multiple carriers. For example, ACK may be transmitted with SRS, CQI, and/or the like using one antenna for ACK and the other for other types of data, using both antennas for both types of data, and so on. Generally, in another example, control data may be transmitted over one antenna at one power with user plane data transmitted over another antenna at another power. Various transmitting combinations are possible, and a subset of examples is presented in the disclosure.

Depending on the UE operation regime, it may be desirable to preserve single carrier (SC) property of uplink (UL) transmission on each of the used PAs/antennas. A subset of the PAs may be utilized up to their maximum available transmit power, and the rest of the PAs may be turned off. The same information may be transmitted on all PAs/antennas in order to achieve transmit diversity. In addition, beamforming and cyclic delay diversity (CDD) may be applied. The PA's transmit power may be filled-up with more than one channel according to a channel prioritization, as it may be required and possible. However, this may break the SC property of the UL transmission.

Several iterations may be required to find a preferred transmission combination between PHY channels and available PAs/antennas. Certain aspects of the present disclosure support implementation of two PAs/antennas at the UE.

In an aspect, ACK or ACK/SR may be transmitted along with SRS, or only SR may be transmitted along with SRS. If the shortened format is allowed (i.e., Simultaneous-AN-and-SRS flag is set to TRUE by higher layers), then ACK or ACK/SR or SR, and SRS may be transmitted on both antennas/PAs with shortened format. The shortened format 1 may be utilized for transmitting SR, and the shortened format 1a/1b may be used for ACK. The SRS may be transmitted on one or both antennas by configuration. This approach may preserve the SC property of the UL transmission.

On the other hand, if the shortened format is not allowed (i.e., Simultaneous-AN-and-SRS is set to FALSE by higher layers), then ACK or ACK/SR or SR may be transmitted with the regular format on both antennas/PAs. SRS may be transmitted on one or both antennas/PAs, if there is enough transmit power. Otherwise, the SRS may be dropped, and regular format ACK may be transmitted. The regular format 1 may be used for transmitting SR, and the format 1a/1b may be used for ACK. The SRS may be transmitted on one or both antennas by configuration. It should be noted that transmitting ACK using the regular format along with SRS may break the SC property of the UL transmission.

In an aspect, ACK or ACK/SR may be transmitted along with CQI. ACK or ACK/SR and CQI may be transmitted on separate resources on both antennas/PAs. The regular format 1a/1b may be used for transmitting ACK, and the regular format 2 may be used for CQI. This may break the SC property of the UL transmission.

Alternatively, ACK or ACK/SR and CQI may be transmitted on separate PA/antenna. The regular format 1a/1b may be used for transmitting ACK on one PA/antenna and the regular format 2 may be used for transmitting CQI on the other PA/antenna. ACK may be additionally transmitted on the PA carrying CQI, if Simultaneous-AN-and-CQI is set to TRUE by higher layers. The regular format 2a/2b may be used for CQI/ACK. This may preserve the SC property of the UL transmission.

In an aspect, SR may be transmitted along with CQI. SR and CQI may be transmitted on separate resources on both PAs/antennas. The regular format 1 may be used for transmitting SR, and the regular format 2 may be used for CQI. This may break the SC property of the UL transmission. Alternatively, SR and CQI may be transmitted on separate antennas/PAs. The regular format 1 may be used for SR transmitted on one PA/antenna, and the regular format 2 may be used for CQI transmitted on the other PA/antenna. This approach may preserve the SC property of the UL transmission.

In an aspect, SR/SRS may be transmitted along with CQI. If the shortened format for SR is allowed, then SR/SRS and CQI may be transmitted on separate resources on both antennas/PAs. The shortened format 1 may be used for both SR and SRS, and the shortened format 2 may be used for CQI. This may break the SC property of the UL transmission.

If the shortened format for SR is not allowed, then SR/SRS and CQI may be transmitted on separate antenna/

PA. The regular format 1 may be used for transmitting SR on one PA/antenna, and the regular format 2 may be used for transmitting CQI on the other PA/antenna. SRS may be transmitted on one or both antennas by configuration. This may break the SC property of the UL transmission. In order to preserve the SC property, the SRS may be dropped if there is not enough transmit power.

In an aspect, SRS may be transmitted along with CQI. CQI may be transmitted on both antennas/PAs, and SRS may be transmitted on one or both antennas/PAs (by SRS configuration), if transmit power limitation allows. The regular format 2 may be used for CQI transmission along with SRS. This may break the SC property of the UL transmission. One or both SRSs may be dropped, if there is not enough transmit power, while the SC property may be preserved.

Alternatively, SRS may be transmitted on one antenna/PA, and CQI may be transmitted on the other antenna/PA. The format 2 may be used for CQI transmission on one PA/antenna and for SRS transmission on the other PA/antenna. A PA/antenna carrying SRS may be determined by the antenna transmission schedule for SRS. If SRS is configured on both antennas and if there is a power available on the antenna/PA transmitting CQI, SRS may be transmitted concurrently with CQI. Otherwise, SRS may be dropped. It should be noted that transmitting CQI concurrently with SRS may break the SC property of the UL transmission.

In an aspect, ACK or ACK/SR may be transmitted along with SRS and along with CQI. If the shortened format is allowed (i.e., Simultaneous-AN-and-SRS is set to TRUE by higher layers), then ACK or ACK/SR, SRS and CQI may be transmitted on separate resources on both antennas/PAs. The shortened format 1a/1b may be used for ACK transmission, and the shortened format 2 or 2a/2b may be used for CQI transmission, if Simultaneous-AN-and-CQI is set to TRUE by higher layers. Utilizing the shortened format 1a/1b and transmitting concurrently SRS and CQI may break the SC property of the UL transmission. If there is not enough transmit power, SRS and CQI may be dropped/power-scaled sequentially.

In another aspect, if the shortened format is allowed, ACK or ACK/SR and SRS may be transmitted on one antenna/PA, and CQI may be transmitted on separate antenna/PA. The shortened format 1a/1b may be used for transmitting ACK and SRS on one antenna/PA, and the shortened format 2 may be used for transmitting CQI on the other antenna/PA. This may preserve the SC property of the UL transmission.

In addition, ACK may be transmitted on the antenna/PA carrying CQI, if Simultaneous-AN-and-CQI is set to TRUE by higher layers. The format 2a/2b may be used for CQI/ACK transmission. A PA/antenna carrying SRS may be determined by the antenna transmission schedule for SRS. If SRS is configured on both antennas and if there is a power available on the antenna/PA with CQI, then SRS may be transmitted concurrently with CQI. Otherwise, SRS may be dropped. It should be noted that the concurrent transmission of CQI and SRS may break the SC property of the UL transmission.

If the shortened format is not allowed (i.e., Simultaneous-AN-and-SRS is set to FALSE by higher layers), then ACK or ACK/SR, SRS and CQI may be transmitted on separate resources on both antennas/PAs. The regular format 1a/1b may be used for ACK transmission, and the regular format 2 or 2a/2b may be used for CQI transmission, if Simultaneous-AN-and-CQI is set to TRUE by higher layers. Utilizing the regular format 1a/1b along with concurrent transmission of SRS and CQI may break the SC property of the UL transmission. If there is not enough transmit power, SRS and CQI may be dropped/power-scaled sequentially.

Alternatively, if the shortened format is not allowed, ACK or ACK/SR may be transmitted on one antenna/PA and CQI may be transmitted on separate antenna/PA. The regular format 1a/1b may be used for ACK transmission on one antenna/PA, and the regular format 2 or 2a/2b may be used for CQI transmission on the other PA/antenna (if Simultaneous-AN-and-CQI flag is set to TRUE by higher layers). If there is a power available on one of the PAs, SRS may be transmitted concurrently on that PA/antenna. Otherwise, SRS may be dropped. Transmitting SRS concurrently with either CQI or with regular format 1a/1b ACK may break the SC property of the UL transmission. A PA/antenna carrying SRS may be determined by the antenna transmission schedule for SRS.

In an aspect, user data may be transmitted along with control information. ACK/CQI may be transmitted on PUCCH, and the rest of the control and data may be transmitted on PUSCH on both antennas/PAs. Regular or shortened format 1a/1b may be used for ACK transmission, depending on Simultaneous-AN-and-SRS setting. SR may be transmitted with ACK on PUCCH, as well as in addition to Buffer Status Report (BSR) on PUSCH. If there is not enough transmit power available, PUSCH may be dropped or power-scaled. If both ACK and CQI are present, the above rules may be applied for PUCCH.

SRS may be configured for transmission on both antennas. If Simultaneous-AN-and-SRS is set to FALSE by higher layers and if there is still some transmit power available, SRS may be transmitted concurrently with ACK. Otherwise, SRS may be dropped. Transmitting ACK with regular format concurrently with SRS may break the SC property of the UL transmission. In an aspect, the regular format 1a/1b may be utilized for ACK transmission. If Simultaneous-AN-and-SRS is set to TRUE by higher layers, then a shortened ACK format and SRS may be transmitted concurrently. The shortened format 1a/1b may be used for ACK.

Figure 5:
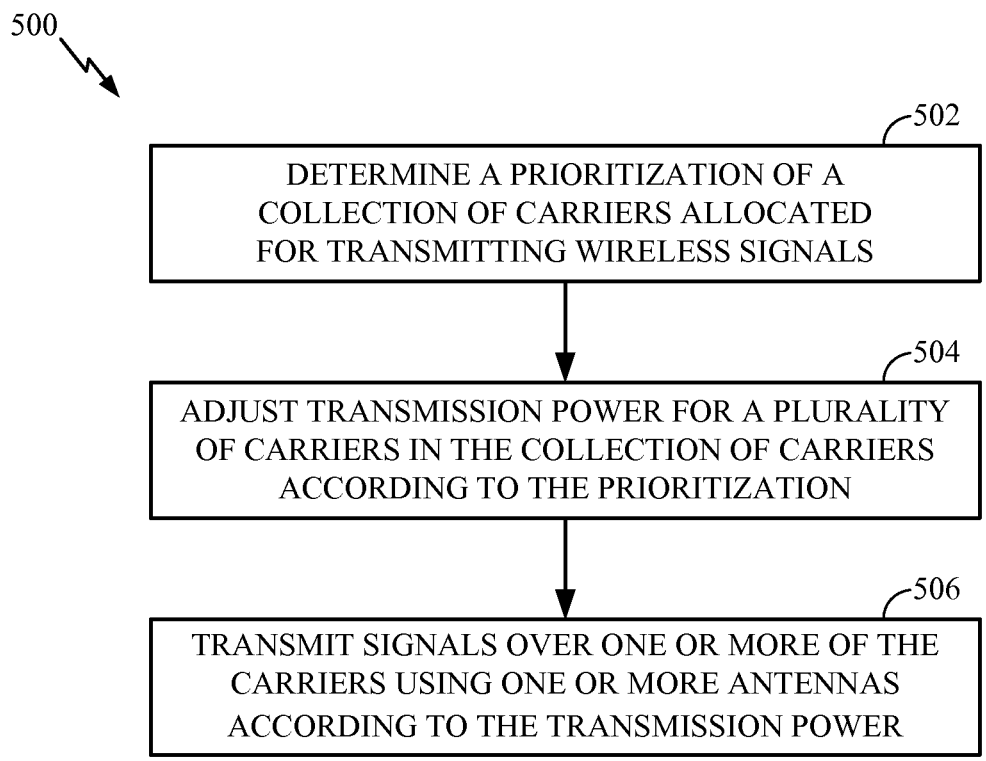
FIG. 5 is a functional block diagram conceptually illustrating example blocks that may be performed at user equipment (UE) in accordance with certain aspects of the present disclosure.

FIG. 5 is a functional block diagram conceptually illustrating example blocks 500 executed at a wireless device (e.g., an access terminal) in accordance with certain aspects of the present disclosure. Operations illustrated by the blocks 500 may be executed, for example, at the processor(s) 260 and/or 270 of the access terminal 250 from FIG. 2, and/or at the circuit(s) 406, 408 and/or 410 of the wireless device 402 from FIG. 4.

The operations may begin, at block 502, by determining a prioritization of a collection of carriers allocated for transmitting wireless signals. At block 504, the access terminal may adjust transmission power for a plurality of carriers in the collection of carriers according to the prioritization. At block 506, the access terminal may transmit signals over one or more of the carriers using one or more antennas according to the transmission power.

In an aspect, determining the prioritization may comprise selecting one or more priority levels for each of a plurality of carriers in the collection of carriers. In another aspect, determining the prioritization may comprise receiving the prioritization from one or more upstream network components. In an aspect, adjusting the transmission power may comprise adjusting transmission power of channels within each of the carriers, wherein the channels may comprise Physical Uplink Control Channel (PUCCH) and Physical Uplink Shared Channel (PUSCH).

In an aspect, the access terminal may transmit a first of the signals having a highest priority among the signals on a first of the carriers, and may transmit one or more of the signals with lower priority than the first signal on a set of the carriers without the first carrier. Further, transmission of Physical Uplink Shared Channel (PUSCH) over the first carrier may have a higher priority than transmission of PUSCH over one or more carriers from the set.

In one configuration, the apparatus 402 for wireless communication includes means for determining a prioritization of a collection of carriers allocated for transmitting wireless signals, means for adjusting transmission power for a plurality of carriers in the collection of carriers according to the prioritization, and means for transmitting signals over one or more of the carriers using one or more antennas according to the transmission power. In one aspect, the aforementioned means may be the circuits 406, 408, 410 configured to perform the functions recited by the aforementioned means. In another aspect, the aforementioned means may be a module or any apparatus configured to perform the functions recited by the aforementioned means.

Figure 6:
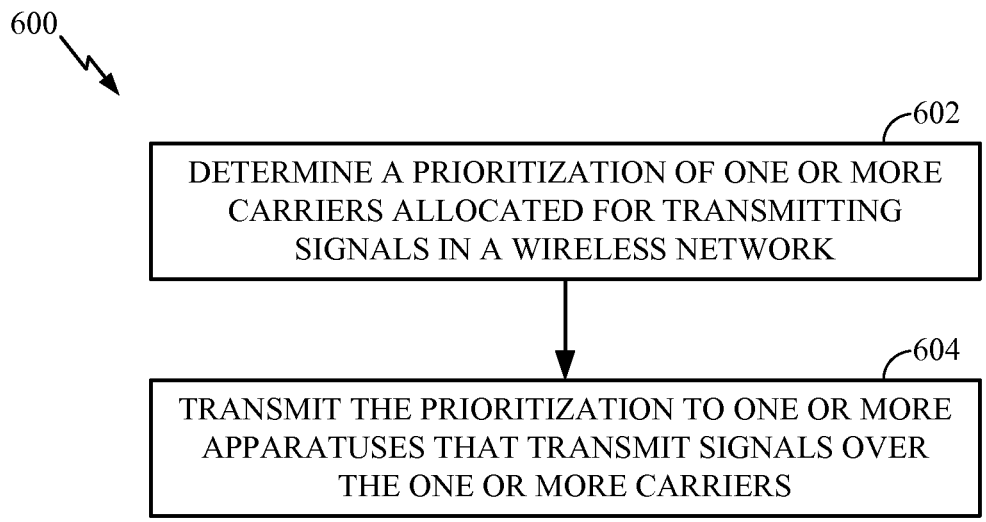
FIG. 6 is a functional block diagram conceptually illustrating example blocks that may be performed at a network device in accordance with certain aspects of the present disclosure.

FIG. 6 is a functional block diagram conceptually illustrating example blocks 600 executed at a network device (e.g., an access point) in accordance with certain aspects of the present disclosure. Operations illustrated by the blocks 600 may be executed, for example, at the processor(s) 220 and/or 230 of the access point 210 from FIG. 2, and/or at the circuit 412 of the network device 404 from FIG. 4.

The operations may begin, at block 602, by determining a prioritization of one or more carriers allocated for transmitting signals in a wireless network. At block 604, the access point may transmit the prioritization to one or more apparatuses that transmit signals over the one or more carriers. In an aspect, the prioritization indicates at least one of the one or more carriers related to a control channel as high priority. In another aspect, the prioritization may be determined from a network specification. In yet another aspect, the prioritization may be based at least in part on a previous prioritization.

In one configuration, the apparatus 404 for wireless communication includes means for determining a prioritization of one or more carriers allocated for transmitting signals in a wireless network, and means for transmitting the prioritization to one or more apparatuses that transmit signals over the one or more carriers. In one aspect, the aforementioned means may be the circuit 412 configured to perform the functions recited by the aforementioned means. In another aspect, the aforementioned means may be a module or any apparatus configured to perform the functions recited by the aforementioned means.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, a phrase referring to "at least one of" a list of items refers to any combination of those items, including single members. As an example, "at least one of: a, b, or c" is intended to cover: a, b, c, a-b, a-c, b-c, and a-b-c.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for wireless communications, comprising:
   determining a prioritization of a plurality of carriers allocated for transmitting wireless signals;
   adjusting transmission power of channels within the plurality of carriers according to the prioritization; and
   transmitting, according to the adjusted transmission power, the channels over the plurality of carriers, wherein when the channels further comprise a Physical Uplink Control Channel (PUCCH), the prioritization further indicates that an Acknowledgement/Negative Acknowledgement (ACK/NACK) feedback of the PUCCH is accommodated for transmission over the plurality of carriers before any other feedback associated with the PUCCH; and wherein when the channels comprise a Physical Uplink Shared Channel (PUSCH), the prioritization indicates that control information together with data on the PUSCH is accommodated for transmission over the plurality of carriers before data without control information on the PUSCH.

2. The method of claim 1, wherein determining the prioritization comprises selecting one or more priority levels for each of the plurality of carriers.

3. The method of claim 1, wherein determining the prioritization comprises receiving the prioritization from one or more upstream network components.

4. The method of claim 1, wherein:
   the channels further comprise a Physical Uplink Control Channel (PUCCH); and
   the prioritization further indicates that PUCCH is accommodated for transmission over the plurality of carriers according to the prioritization before the PUSCH.

5. The method of claim 1, further comprising dropping the PUSCH due to a constraint associated with the transmission power.

6. The method of claim 1, wherein:
   the channels further comprise a Physical Uplink Control Channel (PUCCH); and
   the prioritization further indicates that Radio Resource Control (RRC) and Media Access Control (MAC) signaling of the PUSCH is accommodated for transmission over one or more of the plurality of carriers before at least one of: regular data on the PUSCH over one or more other carriers, regular data along with uplink control information (UCI) on the PUSCH, or the PUCCH.

7. The method of claim 1, wherein transmitting comprises:
   transmitting a first of the channels having a highest priority among the channels on a first of the plurality of carriers; and
   transmitting at least a second of the channels with lower priority than the first of the channels on a set of the plurality of carriers without the first carrier.

8. The method of claim 7, wherein transmission of PUSCH over the first carrier has a higher priority than transmission of PUSCH over one or more carriers from the set.

9. The method of claim 1, wherein the channels comprise two of the following: an acknowledgement (ACK), a scheduling request (SR), a channel quality indicator (CQI), and a sounding reference signal (SRS).

10. The method of claim 1, wherein uniform power scaling is applied across the plurality of carriers over which the PUSCH is accommodated for transmission.

11. An apparatus for wireless communications, comprising:
    at least one processor configured to:
       determine a prioritization of a plurality of carriers allocated for transmitting wireless signals; and
       adjust transmission power of channels within the plurality of carriers according to the prioritization;
    a transmitter configured to transmit, according to the adjusted transmission power, the channels over the plurality of carriers, wherein when the channels further comprise a Physical Uplink Control Channel (PUCCH), the prioritization further indicates that an Acknowledgement/Negative Acknowledgement (ACK/NACK) feedback of the PUCCH is accommodated for transmission over the plurality of carriers before any other feedback associated with the PUCCH; and wherein when the channels comprise a Physical Uplink Shared Channel (PUSCH), the prioritization indicates that control information together with data on the PUSCH is accommodated for transmission over the plurality of carriers before data without control information on the PUSCH; and
    a memory coupled to the at least one processor.

12. The apparatus of claim 11, wherein the at least one processor is also configured to select one or more priority levels for each of the plurality of carriers.

13. The apparatus of claim 11, wherein the at least one processor is also configured to receive the prioritization from one or more upstream network components.

14. The apparatus of claim 11, wherein:
    the channels further comprise a Physical Uplink Control Channel (PUCCH); and
    the prioritization further indicates that PUCCH is accommodated for transmission over the plurality of carriers according to the prioritization before the PUSCH.

15. The apparatus of claim 11, wherein the at least one processor is also configured to drop the PUSCH due to a constraint associated with the transmission power.

16. The apparatus of claim 11, wherein:
    the channels further comprise a Physical Uplink Control Channel (PUCCH); and
    the prioritization further indicates that Radio Resource Control (RRC) and Media Access Control (MAC) signaling of the PUSCH is accommodated for transmission over the one or more of the plurality of carriers before at least one of: regular data on the PUSCH over one or more other carriers, regular data along with uplink control information (UCI) on the PUSCH, or the PUCCH.

17. The apparatus of claim 11, wherein the transmitter is also configured to:
   transmit a first of the channels having a highest priority among the channels on a first of the plurality of carriers; and
   transmit at least a second of the channels with lower priority than the first of the channels on a set of the plurality of carriers without the first carrier.

18. The apparatus of claim 17, wherein transmission of PUSCH over the first carrier has a higher priority than transmission of PUSCH over one or more carriers from the set.

19. An apparatus for wireless communications, comprising:
   means for determining a prioritization of a plurality of carriers allocated for transmitting wireless signals;
   means for adjusting transmission power of channels within the plurality of carriers according to the prioritization; and
   means for transmitting, according to the adjusted transmission power, the channels over the plurality of carriers, wherein when the channels further comprise a Physical Uplink Control Channel (PUCCH), the prioritization further indicates that an Acknowledgement/ Negative Acknowledgement (ACK/NACK) feedback of the PUCCH is accommodated for transmission over the plurality of carriers before any other feedback associated with the PUCCH; and
   wherein when the channels comprise a Physical Uplink Shared Channel (PUSCH), the prioritization indicates that control information together with data on the PUSCH is accommodated for transmission over the plurality of carriers before data without control information on the PUSCH.

20. The apparatus of claim 19, wherein the means for determining the prioritization comprises means for selecting one or more priority levels for each of the plurality of carriers.

21. The apparatus of claim 19, wherein the means for determining the prioritization comprises means for receiving the prioritization from one or more upstream network components.

22. The apparatus of claim 19, wherein:
   the channels further comprise a Physical Uplink Control Channel (PUCCH); and
   the prioritization further indicates that the PUCCH is accommodated for transmission over the plurality of carriers according to the prioritization before the PUSCH.

23. The apparatus of claim 19, further comprising means for dropping the PUSCH due to a constraint associated with the transmission power.

24. The apparatus of claim 19, wherein:
   the channels further comprise a Physical Uplink Control Channel (PUCCH); and
   the prioritization further indicates that Radio Resource Control (RRC) and Media Access Control (MAC) signaling of the PUSCH is accommodated for transmission over one or more of the plurality of carriers before at least one of: regular data on the PUSCH over one or more other carriers, regular data along with uplink control information (UCI) on the PUSCH, or the PUCCH.

25. A non-transitory computer-readable medium comprising code for:
   determining a prioritization of a plurality of carriers allocated for transmitting wireless signals;
   adjusting transmission power of channels within the plurality of carriers according to the prioritization; and
   transmitting, according to the adjusted transmission power, the channels over the plurality of carriers, wherein when the channels further comprise a Physical Uplink Control Channel (PUCCH), the prioritization further indicates that an Acknowledgement/Negative Acknowledgement (ACK/NACK) feedback of the PUCCH is accommodated for transmission over the plurality of carriers before any other feedback associated with the PUCCH; and
   wherein when the channels comprise a Physical Uplink Shared Channel (PUSCH), the prioritization indicates that control information together with data on the PUSCH is accommodated for transmission over the plurality of carriers before data without control information on the PUSCH.

26. The non-transitory computer-readable medium of claim 25, further comprising code for selecting one or more priority levels for each of the plurality of carriers.

27. The non-transitory computer-readable medium of claim 25, further comprising code for receiving the prioritization from one or more upstream network components.

28. The non-transitory computer-readable medium of claim 25, wherein:
   the channels further comprise a Physical Uplink Control Channel (PUCCH); and
   the prioritization further indicates that the PUCCH is accommodated for transmission over the plurality of carriers according to the prioritization before the PUSCH.

29. The non-transitory computer-readable medium of claim 25, further comprising code for dropping the PUSCH due to a constraint associated with the transmission power.

30. The non-transitory computer-readable medium of claim 25, wherein:
   the channels further comprise a Physical Uplink Control Channel (PUCCH); and
   the prioritization further indicates that Radio Resource Control (RRC) and Media Access Control (MAC) signaling of the PUSCH is accommodated for transmission over one or more of the plurality of carriers before at least one of: regular data on the PUSCH over one or more other carriers, regular data along with uplink control information (UCI) on the PUSCH, or the PUCCH.

31. The non-transitory computer-readable medium of claim 25, further comprising code for:
   transmitting a first of the channels having a highest priority among the channels on a first of the plurality of carriers; and
   transmitting at least a second of the channels with lower priority than the first of the channels on a set of the plurality of carriers without the first carrier.

32. The non-transitory computer-readable medium of claim 31, wherein transmission of PUSCH over the first carrier has a higher priority than transmission of PUSCH over one or more carriers from the set.

33. A method for wireless communications, comprising:
   determining a prioritization of a plurality of carriers allocated for transmitting signals in a wireless network; and
   transmitting the prioritization to one or more apparatuses that transmit channels over the plurality of carriers, wherein when the channels further comprise a Physical Uplink Control Channel (PUCCH), the prioritization further indicates that an Acknowledgement/Negative Acknowledgement (ACK/NACK) feedback of the PUCCH is accommodated for transmission over the plurality of carriers before any other feedback associated with the PUCCH; and wherein when the channels comprise a Physical Uplink Shared Channel (PUSCH), the prioritization indicates that control information together with data on the PUSCH is accommodated for transmission over the plurality of carriers before data without control information on the PUSCH.

34. The method of claim 33, wherein the prioritization is determined from a network specification.

35. The method of claim 33, wherein the prioritization is based at least in part on a previous prioritization.

36. The method of claim 33, wherein the prioritization further indicates at least one of the plurality of carriers related to a control channel as high priority.

37. The method of claim 33, wherein the channels comprise two of the following: an acknowledgement (ACK), a scheduling request (SR), a channel quality indicator (CQI), and a sounding reference signal (SRS).

38. An apparatus for wireless communications, comprising:
   at least one processor configured to determine a prioritization of a plurality of carriers allocated for transmitting signals in a wireless network;
   a transmitter configured to transmit the prioritization to one or more apparatuses that transmit channels over the plurality of carriers, wherein when the channels further comprise a Physical Uplink Control Channel (PUCCH), the prioritization further indicates that an Acknowledgement/Negative Acknowledgement (ACK/NACK) feedback of the PUCCH is accommodated for transmission over the plurality of carriers before any other feedback associated with the PUCCH; and
   wherein when the channels comprise a Physical Uplink Shared Channel (PUSCH), the prioritization indicates that control information together with data on the PUSCH is accommodated for transmission over the plurality of carriers before data without control information on the PUSCH; and
   a memory coupled to the at least one processor.

39. The apparatus of claim 38, wherein the prioritization is determined from a network specification.

40. The apparatus of claim 38, wherein the prioritization is based at least in part on a previous prioritization.

41. The apparatus of claim 38, wherein the prioritization further indicates at least one of the plurality of carriers related to a control channel as high priority.

42. An apparatus for wireless communications, comprising:
   means for determining a prioritization of a plurality of carriers allocated for transmitting signals in a wireless network; and
   means for transmitting the prioritization to one or more apparatuses that transmit channels over the plurality of carriers, wherein when the channels further comprise a Physical Uplink Control Channel (PUCCH), the prioritization further indicates that an Acknowledgement/Negative Acknowledgement (ACK/NACK) feedback of the PUCCH is accommodated for transmission over the plurality of carriers before any other feedback associated with the PUCCH; and
   wherein when the channels comprise a Physical Uplink Shared Channel (PUSCH), the prioritization indicates that control information together with data on the PUSCH is accommodated for transmission over the plurality of carriers before data without control information on the PUSCH.

43. The apparatus of claim 42, wherein the prioritization is determined from a network specification.

44. The apparatus of claim 42, wherein the prioritization is based at least in part on a previous prioritization.

45. The apparatus of claim 42, wherein the prioritization further indicates at least one of the plurality of carriers related to a control channel as high priority.

46. A non-transitory computer-readable medium comprising code for:
   determining a prioritization of a plurality of carriers allocated for transmitting signals in a wireless network; and
   transmitting the prioritization to one or more apparatuses that transmit channels over the plurality of carriers, wherein when the channels further comprise a Physical Uplink Control Channel (PUCCH), the prioritization further indicates that an Acknowledgement/Negative Acknowledgement (ACK/NACK) feedback of the PUCCH is accommodated for transmission over the plurality of carriers before any other feedback type of the PUCCH; and
   wherein when the channels comprise a Physical Uplink Shared Channel (PUSCH), the prioritization indicates that control information together with data on the PUSCH is accommodated for transmission over the plurality of carriers before data without control information on the PUSCH.

47. The non-transitory computer-readable medium of claim 46, wherein the prioritization is determined from a network specification.

48. The non-transitory computer-readable medium of claim 46, wherein the prioritization is based at least in part on a previous prioritization.

49. The non-transitory computer-readable medium of claim 46, wherein the prioritization further indicates at least one of the plurality of carriers related to a control channel as high priority.

* * * * *